United States Patent
Ozaki

(10) Patent No.: US 7,062,682 B2
(45) Date of Patent: Jun. 13, 2006

(54) DATA RECORDER AND DATA RECORDING METHOD AVOIDING DATA LOSS DUE TO DATA TRANSFER ERROR

(75) Inventor: Koji Ozaki, Kato (JP)

(73) Assignee: Fujitsu Limited, Kawasaki (JP)

( * ) Notice: Subject to any disclaimer, the term of this patent is extended or adjusted under 35 U.S.C. 154(b) by 521 days.

(21) Appl. No.: 10/341,771

(22) Filed: Jan. 14, 2003

(65) Prior Publication Data

US 2003/0110418 A1    Jun. 12, 2003

Related U.S. Application Data

(63) Continuation of application No. PCT/JP00/07458, filed on Oct. 25, 2000.

(51) Int. Cl.
*G06F 11/00* (2006.01)

(52) U.S. Cl. .............................. 714/42; 714/5; 714/54; 360/53

(58) Field of Classification Search ............. 369/53.42, 369/53.36
See application file for complete search history.

(56) References Cited

U.S. PATENT DOCUMENTS 4,788,672 A * 11/1988 Toyooka et al. ......... 369/30.09

| 5,270,879 A | * | 12/1993 | Shima et al. ................. 360/59 |
| 5,802,551 A | | 9/1998 | Komatsu et al. ............ 711/103 |
| 5,883,868 A | * | 3/1999 | Iwanaga .................. 369/53.31 |
| 6,141,772 A | * | 10/2000 | Hashimoto .................... 714/16 |

FOREIGN PATENT DOCUMENTS

| JP | 3-105704 | 5/1991 |
| JP | 3-223920 | 10/1991 |
| JP | 4-246746 | 9/1992 |
| JP | 5-324217 | 12/1993 |
| JP | 07-105691 | 4/1995 |

* cited by examiner

*Primary Examiner*—Robert Beausoliel
*Assistant Examiner*—Yolanda L. Wilson
(74) *Attorney, Agent, or Firm*—Greer, Burns & Crain, Ltd.

(57) ABSTRACT

A data recorder for recording data on a recording medium includes a data storage part, an error detection part, an erasure part, a determination part, and a recovery part. When the error detection part detects a data transfer error, the determination part determines whether data corresponding to the data erased by the erasure part is stored in the data storage part. When the determination part determines that the corresponding data is stored in the data storage part, a recovery part recovers the erased data on the recording medium based on the stored data.

30 Claims, 11 Drawing Sheets

DATA RECORDER AND DATA RECORDING METHOD AVOIDING DATA LOSS DUE TO DATA TRANSFER ERROR

This is a continuation of International PCT Application No. PCT/JP00/07458 filed Oct. 25, 2000.

TECHNICAL FIELD

The present invention generally relates to data recorders and data recording methods, and more particularly to a data recorder and a data recording method that, in the case of detecting a data transfer error during erasing recorded data from a magneto-optical disk medium in a data writing operation, prevent data loss due to the data transfer error by recovering the erased data or by limitedly performing data erasure and data transfer in parallel.

BACKGROUND ART

According to the conventional method of writing data to a magneto-optical disk medium, as shown in the timing chart of FIG. 1, for instance, erasure of data from the magneto-optical disk medium starts as shown in (b) of FIG. 1 after transfer of writing data (data to be written) from a host to a magneto-optical disk unit is completed as shown in (a) of FIG. 1. When the data erasure is completed, writing of data to the magneto-optical disk medium is started as shown in (c) of FIG. 1. When the data has been written, verification of the written data is started as shown in (d) of FIG. 1. By the completion of the verification, the data writing is completed.

The timing charts of FIGS. 2 and 3 show a well-known data writing method as a method for reducing time for data writing in the timing chart of FIG. 1. This method is disclosed in Japanese Laid-Open Patent Application No. 5-324217.

FIG. 2 shows the case where erasure of data from a storage medium is completed after transfer of writing data is completed. In the timing chart of FIG. 2, when transfer of data from a host to a magneto-optical disk unit is started as shown in (a) of FIG. 2, erasure of data from a magneto-optical disk medium is started as shown in (b) of FIG. 2. When the data erasure is completed, writing of data to the magneto-optical disk medium is started as shown in (c) of FIG. 2. When the data has been written, verification of the written data is started as shown in (d) of FIG. 2. By the completion of the data verification, the data writing is completed.

FIG. 3 shows the case where the erasure of data from the storage medium is completed before the transfer of writing data is completed. In the timing chart of FIG. 3, as in the case of FIG. 2, when the transfer of data from the host to the magneto-optical disk unit is started as shown in (a) of FIG. 3, the erasure of data from the magneto-optical disk medium is started as shown in (b) of FIG. 3. When the data transfer is completed, the writing of data to the magneto-optical disk medium is started as shown in (c) of FIG. 3. When the data has been written, the verification of the written data is started as shown in (d) of FIG. 3. By the completion of the data verification, the data writing is completed.

As shown in FIGS. 2 and 3, in the case of processing the same amount of transferred data as in the data writing of FIG. 1, the method of the prior art enables reduction in data writing time by starting data erasure (b) in synchronization with the start of data transfer (a) and starting data writing to the magneto-optical disk medium at the time of the completion of the data transfer (a) or the data erasure (b).

However, if an error occurs during the transfer of writing data in the writing control that simultaneously performs transfer of writing data and data erasure for writing as shown in FIGS. 2 and 3, the data writing operation cannot be continued so that the data erasure is immediately suspended. Part of the data existing before data writing is lost by the suspension of the data erasure. If the transfer of writing data is completed without retrying the write command from the host thereafter, the part of the data remains lost.

In many magneto-optical disk media, important data such as file management information for managing the recorded files is arranged close to each start address. Therefore, if the data close to a start address is lost by data transfer error, the magneto-optical disk medium cannot be used thereafter.

With a recent increase in the data transfer rate, the rate of occurrence of data transfer error has become higher, so that it is desired to avoid data loss caused by data transfer error.

DISCLOSURE OF THE INVENTION

Accordingly, it is a general object of the present invention to provide a data recorder and a data recording method in which the above-described disadvantage is eliminated.

A more specific object of the present invention is to provide a data recorder and a data recording method that store transferred data in a memory each time the data is transferred to or from a host apparatus and avoids data loss by using the data stored in the memory.

The above objects of the present invention are achieved by a data recorder for recording data on a recording medium requiring erasure of recorded data before recording the data, the data recorder including: a data storage part storing data exchanged between the data recorder and a host apparatus; an error detection part detecting a data transfer error during transfer of first data from the host apparatus; an erasure part erasing second data recorded on the recording medium; a determination part that, when the error detection part detects the data transfer error, determines whether data corresponding to the second data erased by the erasure part is stored in the data storage part; and a recovery part that, when the determination part determines that the corresponding data is stored in the data storage part, recovers the erased second data on the recording medium based on the stored data.

According to the above-described data recorder, the data exchanged between the data recorder and the host apparatus are stored, so that the data erased from the recording medium in order to record new data can be recovered based on the stored data even when a data transfer error occurs.

The above objects of the present invention are also achieved by a method for recording data on a recording medium requiring erasure of recorded data before recording the data, the method including the steps of: (a) detecting a data transfer error during transfer of first data from a host apparatus to a data recorder; (b) erasing second data recorded on the recording medium; (c) determining whether data corresponding to the second data erased by the step (b) is stored in the data recorder when the step (a) detects the data transfer error; and (d) recovering the erased second data on the recording medium based on the data stored in the data recorder when the step (c) determines that the corresponding data is stored in the data recorder.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description will now be given, with reference to the accompanying drawings, of an embodiment of the present invention.

Figure 4:
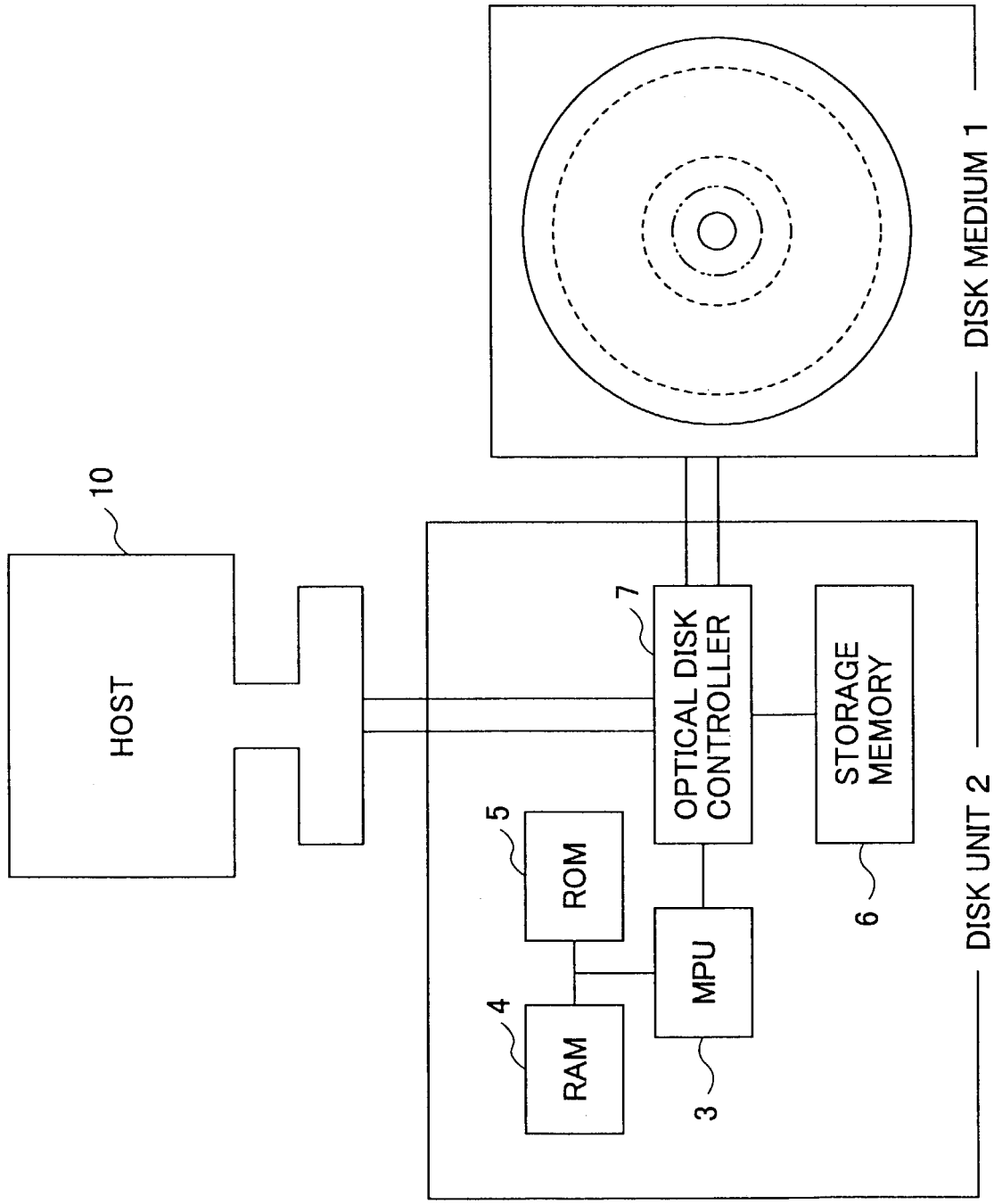
FIG. 4 is a diagram showing a hardware configuration according to an embodiment of the present invention.

FIG. 4 is a diagram showing a hardware configuration according to this embodiment.

In FIG. 4, a magneto-optical disk unit 2 of this embodiment includes an MPU 3, a RAM 4, a ROM 5, a storage memory 6 as a data buffer, and an optical disk controller 7. The magneto-optical disk unit 2 is connected to a host 10 and a magneto-optical disk medium 1.

The MPU 3 controls the entire magneto-optical disk unit 2 in accordance with a command issued by the host 10. Further, the MPU 3 detects a writing address.

In addition, using the RAM 4, the MPU 3 performs a storage memory management operation of managing the storage memory 6 for writing to or reading from the magneto-optical disk medium 1.

Under the control of MPU 3, the optical disk controller 7 controls a data transfer operation of transferring data between the host 10 and the magneto-optical disk unit 2, and controls data writing (WRITE) and data reading (READ) between the magneto-optical disk medium 1 and the magneto-optical disk unit 2. Further, the optical disk controller 7 controls a data transfer error operation of detecting data transfer error during data transfer from the host 10.

Furthermore, the optical disk controller 7 performs a writing address notification operation of controlling notification of writing addresses by the host 10, and performs a data transfer rate notification operation of notifying a data transfer rate.

The ROM 5 stores necessary data for controlling the magneto-optical disk unit 2 and is referred to by the MPU 3.

In FIG. 4, when the host 10 issues a data WRITE command, the data transfer operation is started. That is, the optical disk controller 7 transfers writing data from the host 10 to the magneto-optical disk unit 2. At the same time that the data transfer operation is started, a recording reproduction operation is started so that data recorded on the magneto-optical disk medium 1 is erased by the optical disk controller 7 so as to write the transferred data. The transfer of the writing data and the erasure of the recorded data on the magneto-optical disk medium 1 are simultaneously performed during the recording reproduction operation.

When both data transfer and data erasure are completed in the recording reproduction operation, the optical disk controller 7 writes the writing data to the magneto-optical disk medium 1, and reads out the data written on the magneto-optical disk medium 1 for verification. After the verification of the written data, the optical disk controller 7 informs the host 10 of the completion of the data writing.

On the other hand, if the optical disk controller 7 detects an error during the transfer of writing data while the data is being erased from the magneto-optical disk medium 1, the data erasure is immediately suspended. Then, the MPU 3 performs the later-described storage memory management operation so as to determine whether the erased data recorded on the magneto-optical disk medium 1 is stored in the storage memory 6 by the previous data writing or data reading.

If the erased data is stored in the storage memory 6, the optical disk controller 7 writes the data erased during the recording reproduction operation to the magneto-optical disk medium 1 and verifies the written data, thereby recovering the data on the magneto-optical disk medium 1.

If the erased data is not stored in the storage memory 6, the optical disk controller 7 informs the host 10 that the data writing has been suspended due to detection of the data transfer error.

Next, a description will be given of the storage memory management operation.

Figure 5:
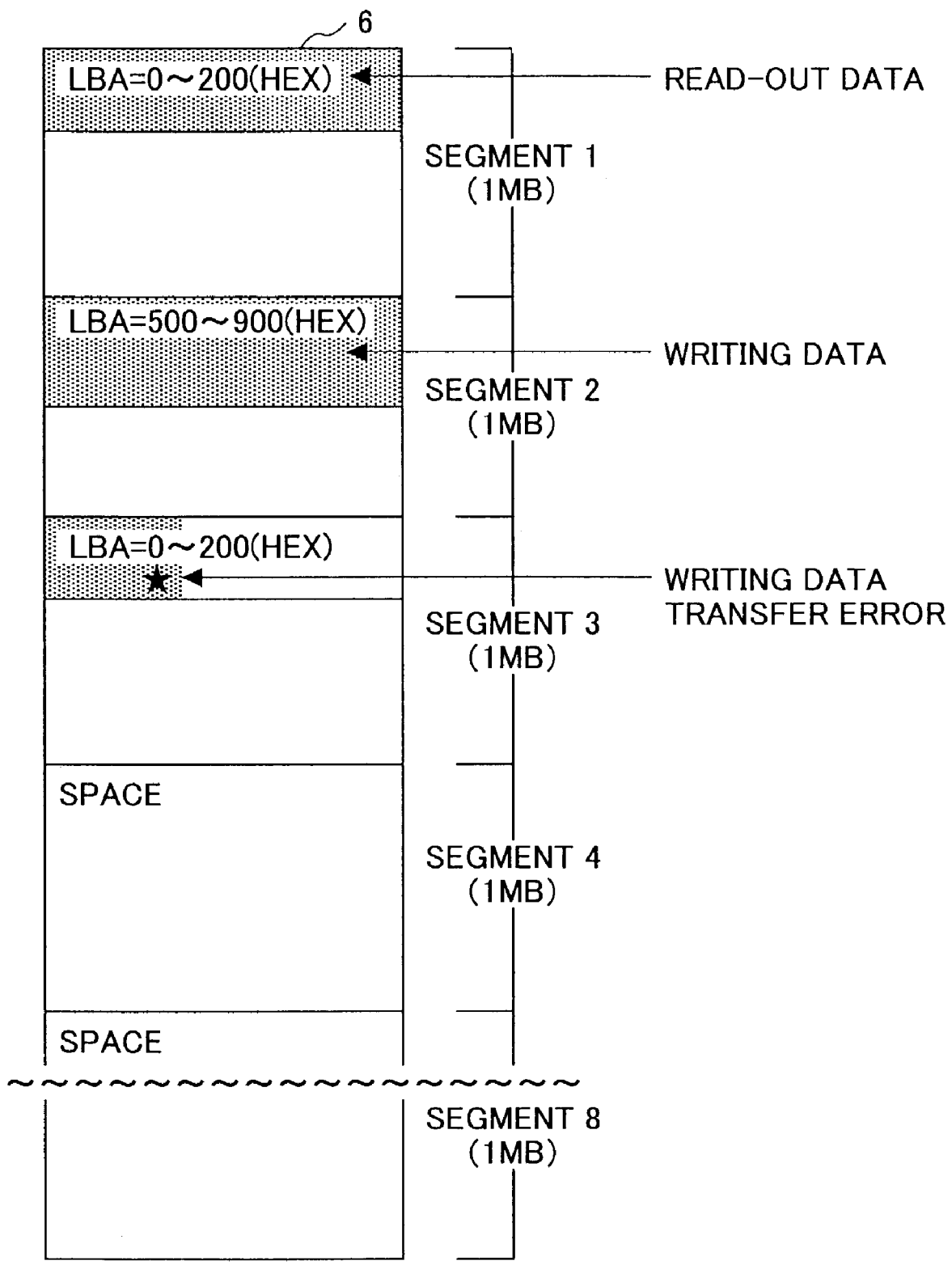
FIG. 5 is a diagram showing one example of storage memory management according to the embodiment of the present invention.

FIG. 5 is a diagram showing one example of storage memory management.

According to FIG. 5, the storage memory 6 has an 8 MB storage capacity as a data buffer in the magneto-optical disk unit 2 and is divided into eight segments each of 1 MB. Each segment is used indiscriminately for both data reading and data writing.

In the storage memory management operation, the MPU 3 determines the next segment to be used by referring to the RAM 4 storing a segment management table recording logical address information indicating the logical address range of data stored in each segment and order information (order numbers) indicating the number of each segment in the order the segments have come into use. If the storage memory 6 has unused segments, the unused segments are used in the ascending order of their order numbers. When all the segments are used, the segment corresponding to the oldest order information (the smallest order number) is used.

For instance, when the host 10 issues an "LBA=000~200 data READ command" specifying the logical block addresses (LBAs) of hexadecimal (hereinafter HEX) 000 through 200, the optical disk controller 7 of the magneto-optical disk unit 2 reads data recorded on the magneto-optical disk medium 1 at the specified addresses. The data read from the magneto-optical disk medium 1 is temporarily stored in the storage memory 6 of the magneto-optical disk unit 2. That is, if all the segments are unused when the MPU 3 refers to the segment management table, the MPU 3 instructs the optical disk controller 7 to use the segments from SEGMENT #1. The optical disk controller 7 transfers the read-out LBA=000~200 (HEX) data to SEGMENT #1 of the storage memory 6, and thereafter, transfers the data to the host 10.

Next, a description will be given, with reference to FIGS. 5 and 6, of the case where the data writing corresponding to a data WRITE command issued from the host 10 is completed normally.

Figure 6:
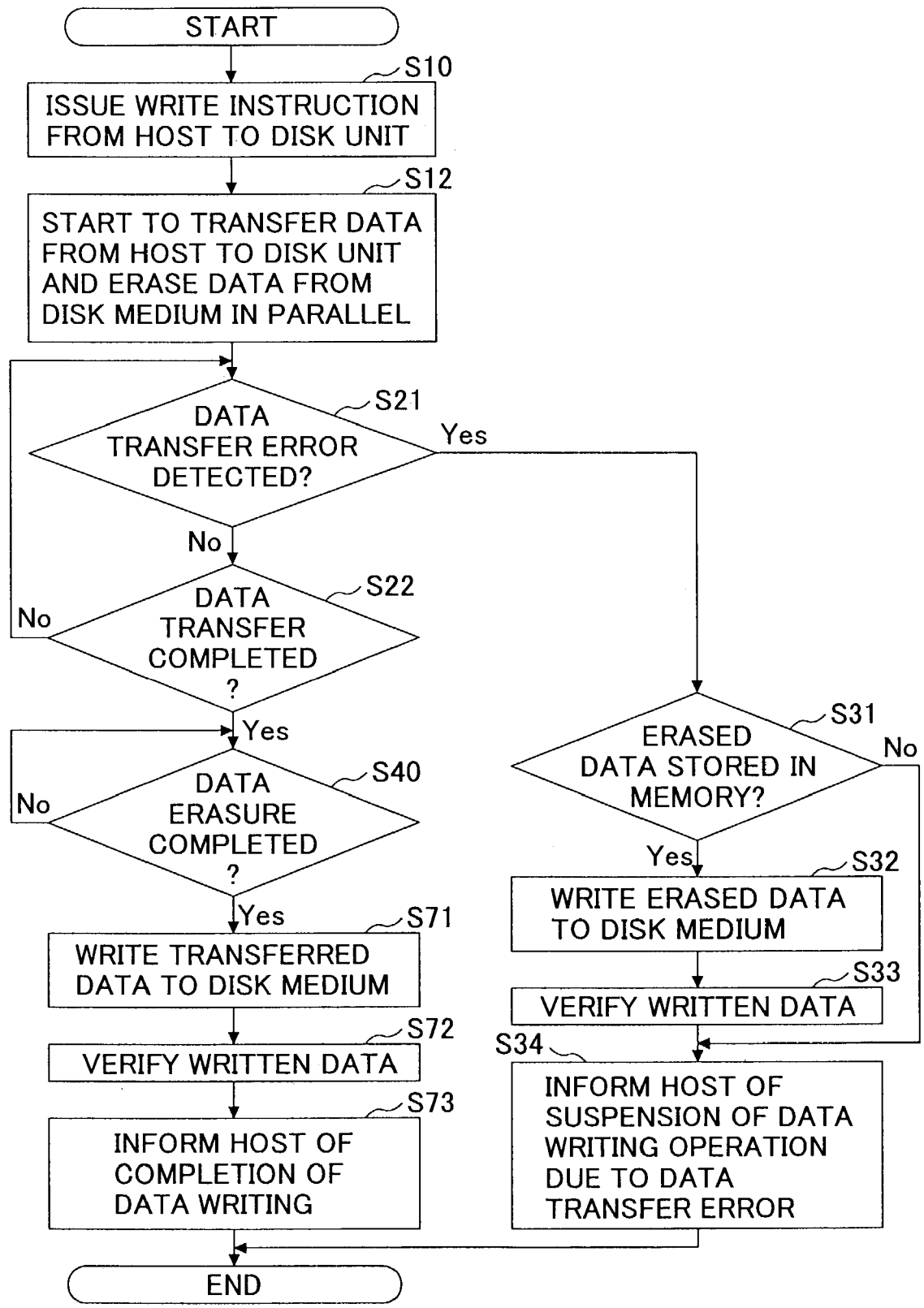
FIG. 6 is a flowchart of a first recovery operation according to the embodiment of the present invention.

FIG. 6 is a flowchart of a first recovery operation according to this embodiment.

In step S10 of FIG. 6, the host 10 issues, for instance, an "LBA=500~900 (HEX) data WRITE command" to the magneto-optical disk unit 2, so that the MPU 3 instructs the optical disk controller 7 to perform data writing. Then, in step S12, the optical disk controller 7 starts to transfer writing data from the host 10 to the magneto-optical disk unit 2. At the same time, in parallel with the data transfer, the optical disk controller 7 starts to erase data recorded on the magneto-optical disk medium 1 for writing the transferred data.

That is, the MPU 3 refers to the segment management table and instructs the optical disk controller 7 to use SEGMENT #2 next to SEGMENT #1 since SEGMENT #1 is previously used. Receiving the instruction from the MPU 3, the optical disk controller 7 transfers the writing data to be written to the LBAs of 500 through 900 (HEX) to SEGMENT #2 of the storage memory 6.

In step S21, it is determined whether an error is detected during the data transfer by the optical disk controller 7. If no data transfer error is detected in step S21, that is, if the data writing operation is being performed normally, in step S22, it is determined whether the data transfer is completed. If it is determined in step S22 that the data transfer is not completed, the operation returns to step S21, so that steps S21 and S22 are repeated until the data transfer is completed. By repeating steps S21 and S22, the writing data is stored in SEGMENT #2 of the storage memory 6 of FIG. 5. When the data transfer is thus completed, in step S40, it is determined whether the data erasure is completed.

After the completion of the data erasure, in step S71, the optical disk controller 7 writes the writing data transferred from the host 10 to the magneto-optical disk medium 1. Further, in step S72, the optical disk controller 7 verifies the data written to the magneto-optical disk medium 1.

After the verification of the written data, in step S73, the optical disk controller 7 informs the host 10 of the completion of the data writing (data writing operation).

Next, a description will be given, with reference to FIGS. 5 and 6, of the case where a data transfer error occurs during the data writing operation based on the subsequent data WRITE command issued from the host 10.

In step S10 of FIG. 6, the host 10 issues, for instance, an "LBA=000~200 (HEX) data WRITE command" to the magneto-optical disk unit 2, so that the MPU 3 instructs the optical disk controller 7 to perform data writing. Then, in step S12, the optical disk controller 7 starts to transfer writing data from the host 10 to the magneto-optical disk unit 2. At the same time, in parallel with the data transfer, the optical disk controller 7 starts to erase data recorded at the specified addresses on the magneto-optical disk medium 1 in order to write the transferred data.

In this case, the MPU 3 refers to the segment management table and instructs the optical disk controller 7 to use SEGMENT #3 next to SEGMENT #2 since SEGMENTs #1 and #2 are previously used. Receiving the instruction from the MPU 3, the optical disk controller 7 starts to transfer the writing data to be written to the LBAs of 000 through 200 (HEX) to SEGMENT #3 of the storage memory 6.

However, when it is determined in step S21 that an error is detected during the data transfer, in step S31, the MPU 3 determines whether the data erased from the magneto-optical disk medium 1 is stored in the storage memory 6. If the MPU 3 determines in step S31 that the data erased from the magneto-optical disk medium 1 is not stored in the storage memory 6, in step S34, the optical disk controller 7 informs the host 10 of the suspension of the data writing operation due to the data transfer error.

In this embodiment, since the data of the LBAs of 000 through 200 (HEX) is stored in SEGMENT #1 of the storage memory 6, the MPU 3 determines in step S31 that the data erased from the magneto-optical disk medium 1 is stored in the storage memory 6, and in step S32, the optical disk controller 7 writes the data of the LBAs of 000 through 200 (HEX) stored in SEGMENT #1 to the magneto-optical disk medium 1.

After writing the data of the LBAs of 000 through 200 (HEX) to the magneto-optical disk medium 1, in step S33, the optical disk controller 7 verifies the written data, and in step S34, informs the host 10 of the suspension of the data writing operation due to the data transfer error.

Thereby, the data erased by the data transfer error can be recovered.

When the host 10 is informed of the suspension of the data writing operation in step S34, normally, the host 10 reissues the data WRITE command specifying the same LBAs. When the data transfer is normally completed by retrying the reissued data WRITE command, the recovered data is replaced by the transferred data to be written.

In this case, the data before the erasure is stored only in SEGMENT #1 of the storage memory 6. However, if the data before the erasure is stored in a plurality of segments, the data stored in the segment corresponding to the latest, or the largest, order number is written to the magneto-optical disk medium 1.

Figure 7:
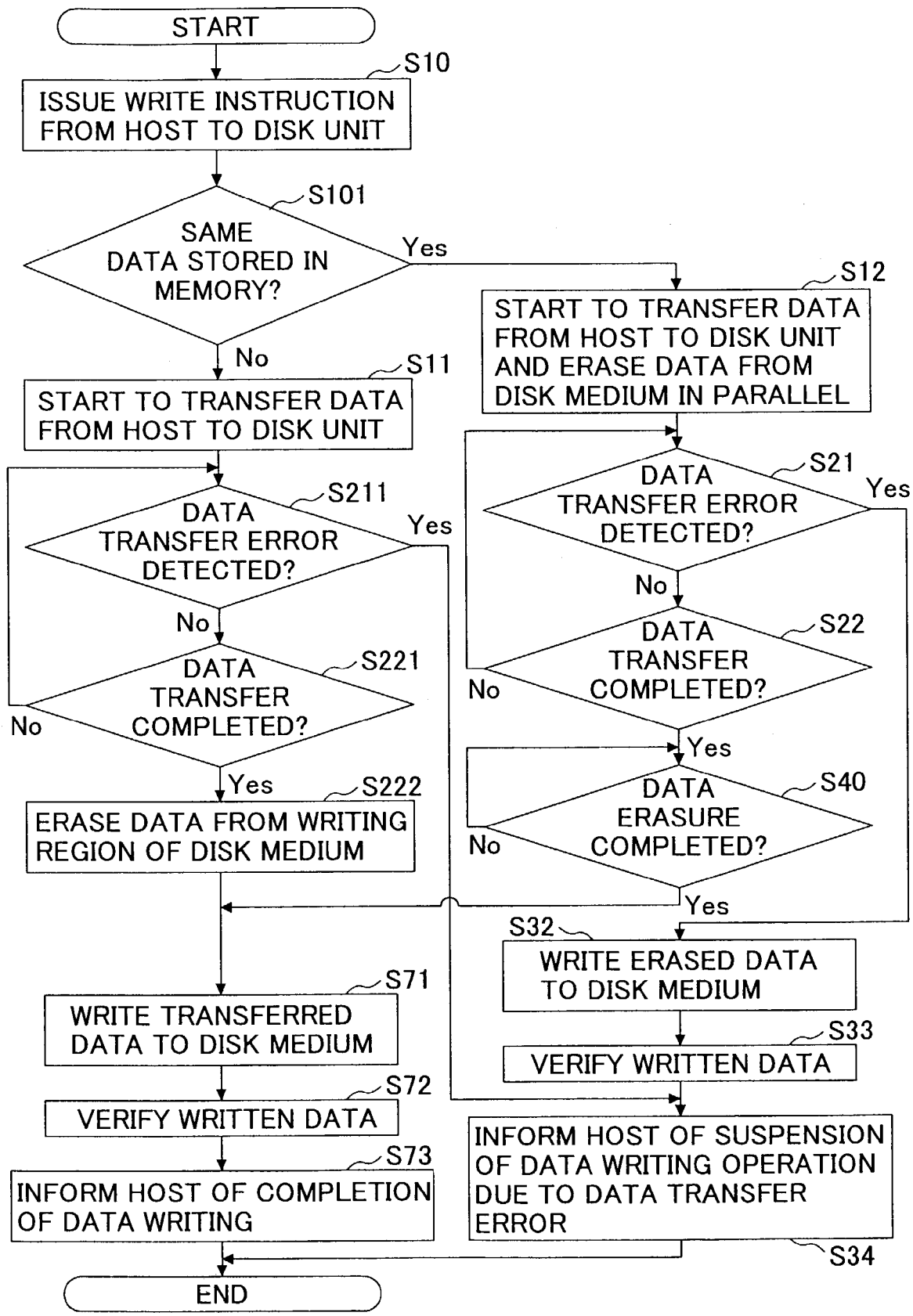
FIG. 7 is a flowchart of a second recovery operation according to the embodiment of the present invention.

FIG. 7 is a flowchart of a second recovery operation according to this embodiment. In FIG. 7, the same steps as those of FIG. 6 are referred to by the same numerals, and a description thereof will be omitted.

In step S10 of FIG. 7, the host 10 gives an instruction to perform data writing to the magneto-optical disk unit 2 by issuing a data WRITE command thereto. Then, in step S101, referring to the segment management table, the MPU 3 determines whether the storage memory 6 stores the same data as that recorded on the magneto-optical disk medium 1 at the LBAs specified by the data WRITE command issued by the host 10.

If the MPU 3 determines in step S101 that the storage memory 6 stores the same data, the same operation as that of step S12 and the following steps of the first recovery operation of FIG. 6 is performed.

If the MPU 3 determines in step S101 that the storage memory 6 does not store the same data, in step S11, the optical disk controller 7 starts to transfer writing data from the host 10 to the magneto-optical disk unit 2. In this case, unlike in the first recovery operation, the optical disk controller 7 only transfers the writing data, and is prevented from simultaneously erasing the data from the magneto-optical disk medium 1 for writing the transferred data.

Then, in step S211, it is determined whether a data transfer error is detected by the optical disk controller 7. If it is determined in step S211 that a data transfer error is detected, in step S34, the optical disk controller 7 informs the host 10 of the suspension of the data writing operation due to the data transfer error.

If it is determined in step S211 that no data transfer error is detected, in step S221, it is determined whether the data transfer is completed. If the data transfer is not completed in step S221, steps S211 and S221 are repeated until the data transfer is completed.

After the data transfer is completed, in step S222, the optical disk controller 7 erases the data from the region of the magneto-optical disk medium 1 to which region the transferred data is written. Thereafter, as in the first recovery operation of FIG. 6, steps S71, S72, and S73 are performed, so that the operation is terminated.

Figure 1:
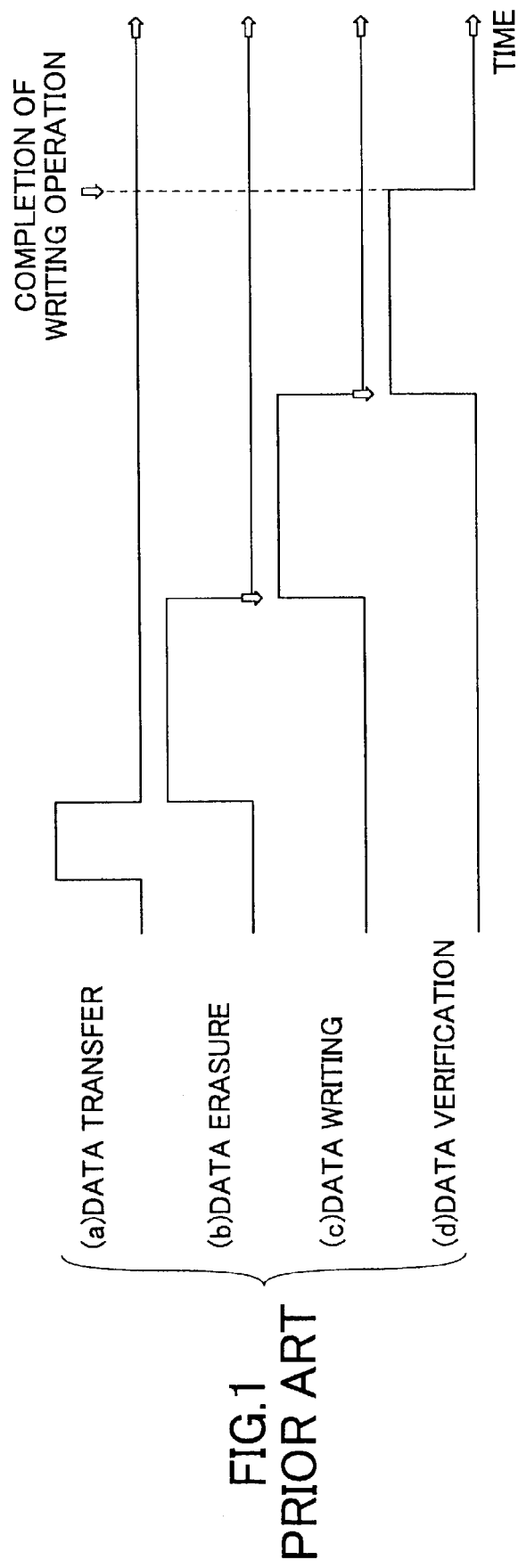
FIG. 1 is a timing chart of a data writing operation where erasure of data from a recording medium is started after completion of transfer of writing data.
Figure 2:
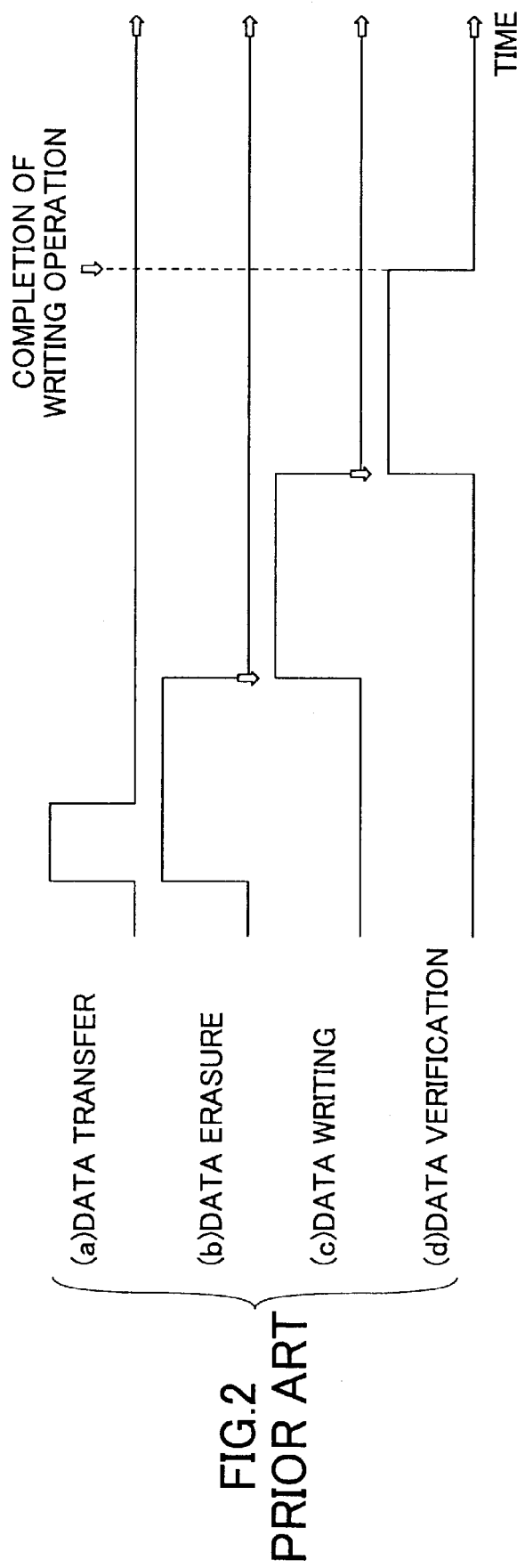
FIG. 2 is a timing chart of a data writing operation where erasure of data from a recording medium is completed after completion of transfer of writing data.
Figure 3:
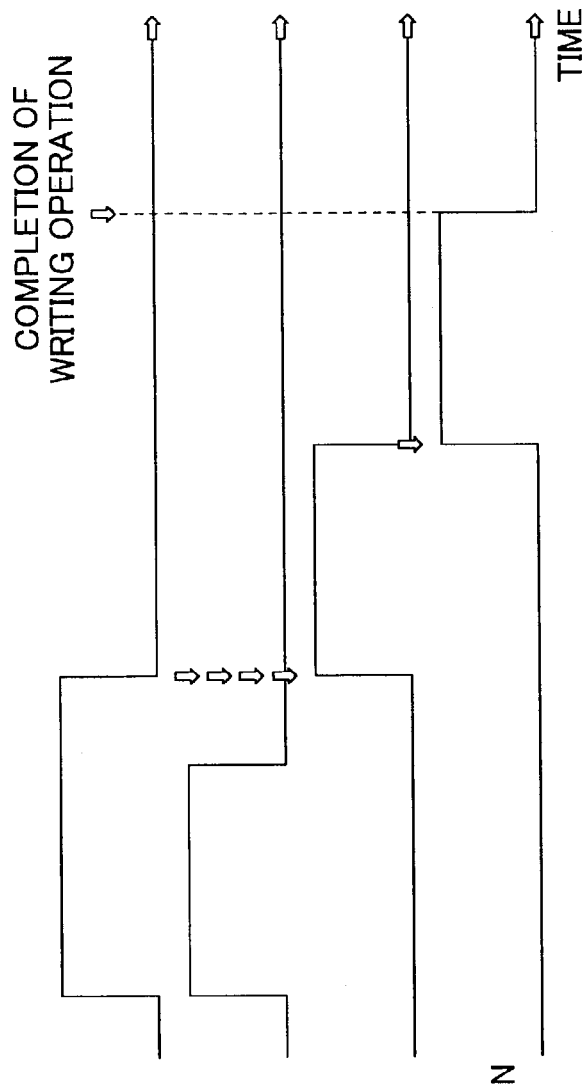
FIG. 3 is a timing chart of a data writing operation where erasure of data from a recording medium is completed before completion of transfer of writing data.

In the second recovery operation, when the host 10 issues a data WRITE command, it is determined whether data for recovery is stored in the storage memory 6. If no recovery data is stored, data is erased from the magneto-optical disk medium 1 after completion of the transfer of writing data as shown in FIG. 1. Therefore, even when an error is detected during the data transfer, the data recorded on the magneto-optical disk medium 1 is prevented from being erased before the completion of the data transfer, thereby preventing the data transfer error from causing data loss.

Figure 8:
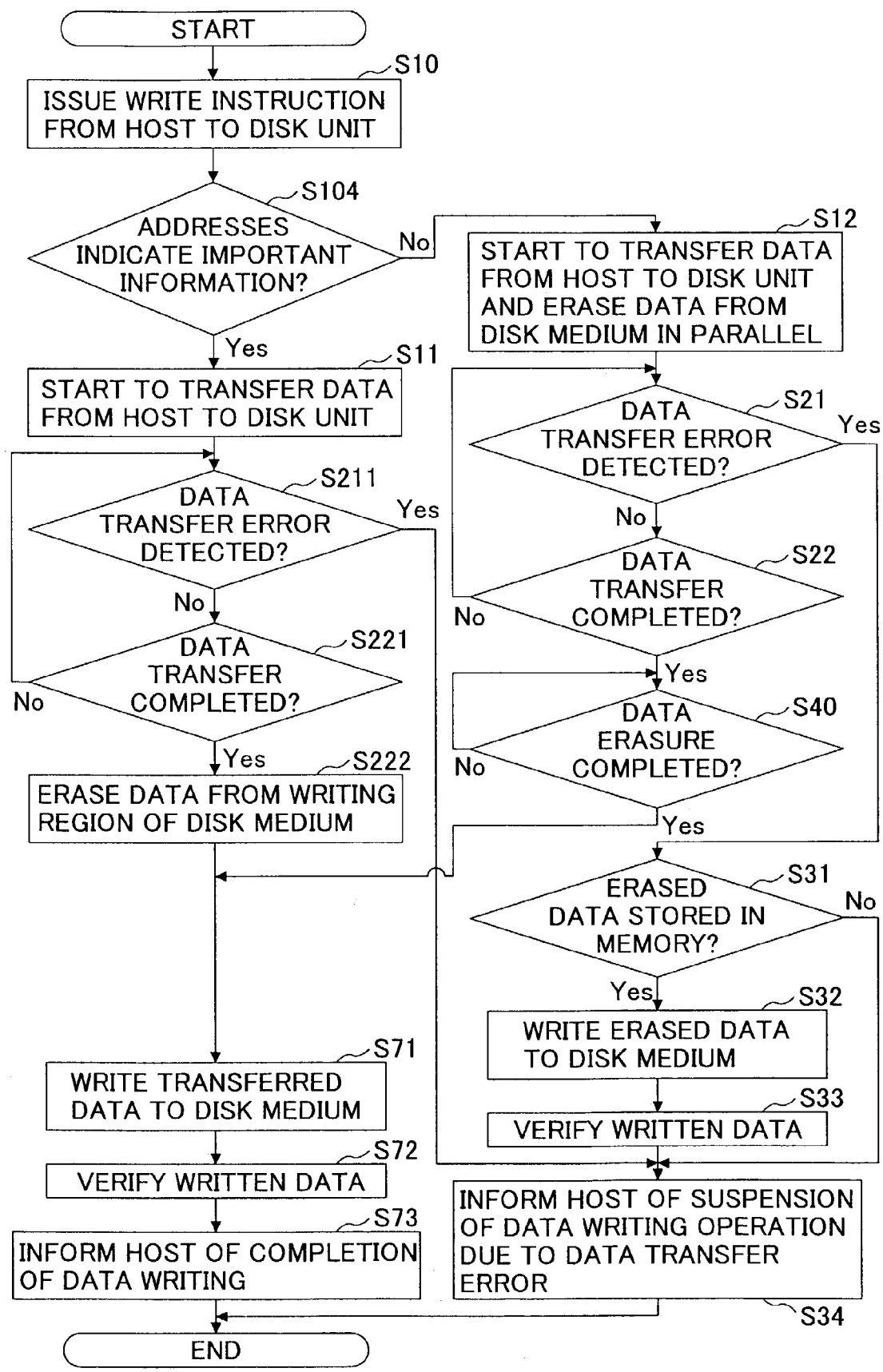
FIG. 8 is a flowchart of a third recovery operation according to the embodiment of the present invention.

FIG. 8 is a flowchart of a third recovery operation according to this embodiment.

In step S10 of FIG. 8, the host 10 gives an instruction to perform data writing to the magneto-optical disk unit 2 by issuing a data WRITE command thereto. Then, in step S104, the MPU 3 determines whether the addresses given by the host 10 specify important information. That is, the MPU 3 determines whether the addresses given by the host 10 indicate a predetermined region storing important information such as a file address or a block address.

If the MPU 3 determines in step S104 that the addresses given by the host 10 do not specify important information, in step S12 and the following steps, the same operation as that in the first recovery operation of FIG. 6 is performed. On the other hand, if the MPU 3 determines in step S104 that the given addresses specify important information, in step S11 and the following steps, the same operation as that in the second recovery operation of FIG. 7 is performed.

According to the third recovery operation, when the host 10 issues a data WRITE command, the MPU 3 determines whether the addresses given by the host 10 specify important information. If the addresses indicate important information, data is erased from the magneto-optical disk medium 1 after completion of the transfer of writing data as shown in FIG. 1. Therefore, even when an error is detected during the data transfer, the data recorded on the magneto-optical disk medium 1 is prevented from being erased before the completion of the data transfer, thereby preventing the data transfer error from causing data loss.

On the other hand, if the addresses do not indicate important information, the data transfer and the data erasure are performed in parallel with each other, so that (data writing) operation time can be reduced.

Figure 9:
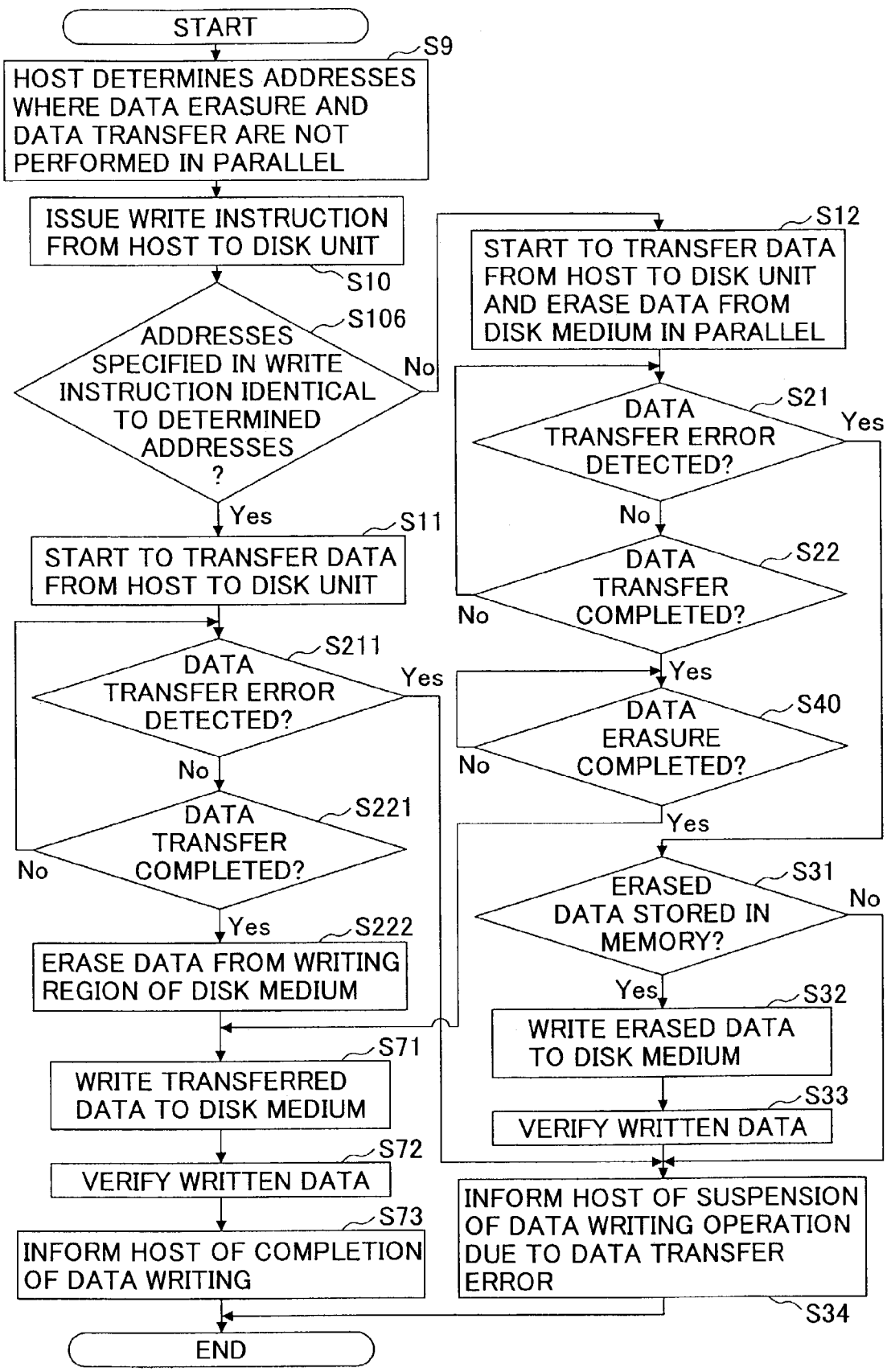
FIG. 9 is a flowchart of a fourth recovery operation according to the embodiment of the present invention.

FIG. 9 is a flowchart of a fourth recovery operation according to this embodiment.

In step S9 of FIG. 9, before giving an instruction to perform data writing, the host 10 determines addresses at which writing data transfer and data erasure are not to be performed in parallel with each other. For instance, the host 10 determines addresses set by a user as the addresses at which writing data transfer and data erasure are not to be performed in parallel.

Then, in step S10, the host 10 gives an instruction to perform data writing to the magneto-optical disk unit 2 by issuing a data WRITE command thereto. Then, in step S106, the MPU 3 determines whether the addresses specified in the instruction of the host 10 are identical to the addresses determined in step S9.

If the MPU 3 determines in step S106 that the specified addresses are not identical to the determined addresses, that is, if the MPU 3 determines in step S106 that data transfer and data erasure can be performed in parallel at the specified addresses, in step S12 and the following steps, the same operation as that of the first recovery operation of FIG. 6 is performed. On the other hand, if the MPU 3 determines in step S106 that the specified addresses are identical to the determined addresses, that is, if the MPU 3 determines in step S106 that data transfer and data erasure are not to be performed in parallel at the specified addresses, in step S11 and the following steps, the same operation as that of the second recovery operation of FIG. 7 is performed.

According to the third recovery operation, the host 10, before giving an instruction to perform data writing, determines a region of the magneto-optical disk medium 1 in which region data erasure and data transfer are not to be performed in parallel. Therefore, in the case of transferring writing data with a determined region in which data erasure is not to be performed in parallel with data transfer, data is erased from the magneto-optical disk medium 1 after completion of the data transfer as shown in FIG. 1. Therefore, even when an error is detected during the data transfer, the data recorded on the magneto-optical disk medium 1 is prevented from being erased before the completion of the data transfer, thereby preventing the data transfer error from causing data loss.

On the other hand, in the case of transferring writing data without any determined region in which data erasure is not to be performed in parallel with data transfer, data transfer and data erasure are performed in parallel, so that operation time can be reduced.

Figure 10:
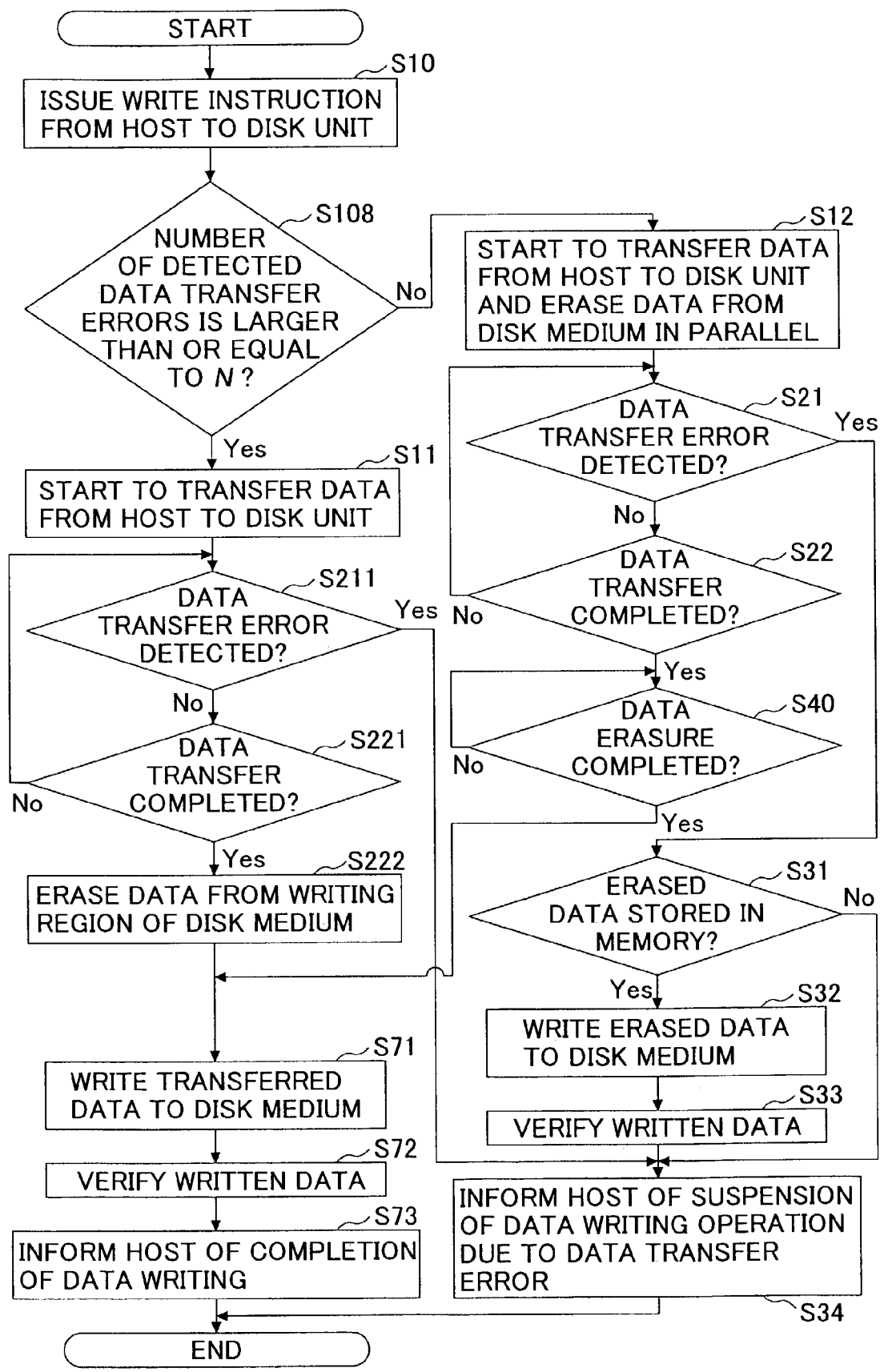
FIG. 10 is a flowchart of a fifth recovery operation according to the embodiment of the present invention.

FIG. 10 is a flowchart of a fifth recovery operation according to this embodiment.

In step S10 of FIG. 10, the host 10 gives an instruction to perform data writing to the magneto-optical disk unit 2 by issuing a data WRITE command thereto. Then, in step S108, the MPU 3 determines whether the number of data transfer errors that have been detected so far by the optical disk controller 7 is larger than or equal to N. If the MPU 3 determines in step S108 that the number of data transfer errors is smaller than N (that is, "NO" in step S108), in step S12 and the following steps, the same operation as that of the first recovery operation of FIG. 6 is performed. On the other hand, if the number of data transfer errors is larger than or equal to N, in step S11 and the following steps, the same operation as that of the second recovery operation of FIG. 7 is performed.

According to the fifth recovery operation, when the host 10 issues a data WRITE command, the number of previously detected data transfer errors is checked, and if the number is larger than or equal to a predetermined number, data is erased from the magneto-optical disk medium 1 after completion of the transfer of writing data as shown in FIG. 1. Therefore, even when an error is detected during the data transfer, the data recorded on the magneto-optical disk medium 1 is prevented from being erased before the completion of the data transfer, thereby preventing the data transfer error from causing data loss.

On the other hand, if the number of previously detected data transfer errors is smaller than the predetermined number, data transfer and data erasure are performed in parallel, so that operation time can be reduced.

In the fifth recovery operation, the cumulative number of data transfer errors which number is larger than or equal to a predetermined number (N) is checked. Alternatively, the ON-OFF state of a flag indicating a data transfer error may be checked. That is, when the flag is ON, it indicates the occurrence of one (N=1) data transfer error or more, and in this case, data is erased from the magneto-optical disk medium 1 after completion of the transfer of writing data as shown in FIG. 1.

Figure 11:
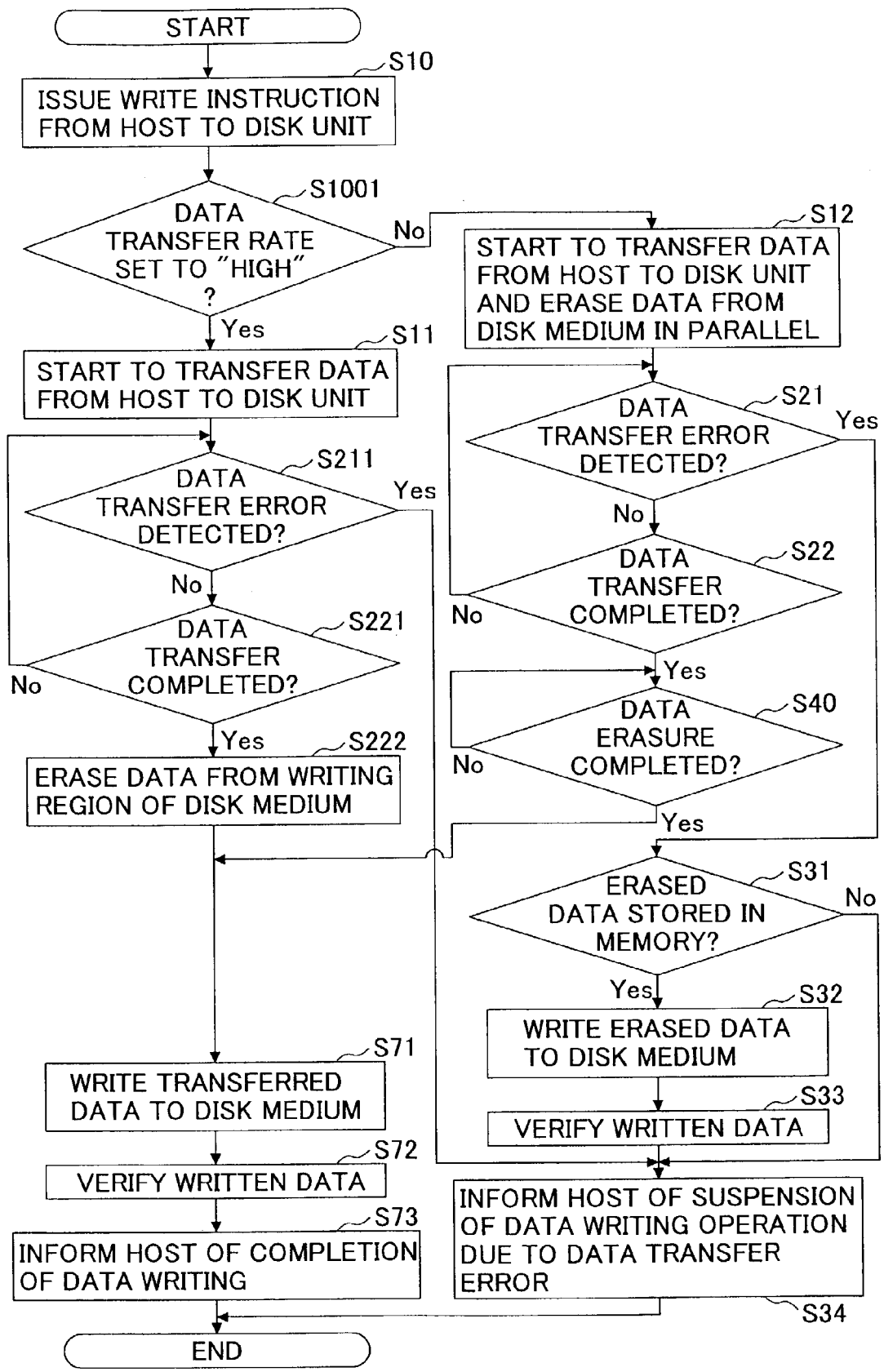
FIG. 11 is a flowchart of a sixth recovery operation according to the embodiment of the present invention.

FIG. 11 is a flowchart of a sixth recovery operation according to this embodiment.

In step S10 of FIG. 11, the host 10 gives an instruction to perform data writing to the magneto-optical disk unit 2 by issuing a data WRITE command thereto. Then, in step S1001, the MPU 3 determines whether the data transfer rate is set to HIGH (that is, a rate higher than or equal to a predetermined rate). The data transfer rate is preset by the host 10.

If the MPU 3 determines that the data transfer rate is set to HIGH, data is erased from the magneto-optical disk medium 1 after completion of the data transfer as shown in FIG. 1. Therefore, even when an error is detected during the data transfer, the data recorded on the magneto-optical disk medium 1 is prevented from being erased before the completion of the data transfer, thereby preventing the data transfer error from causing data loss.

On the other hand, if the MPU 3 determines that the data transfer rate is not set to HIGH, data transfer and data erasure are performed in parallel, so that operation time can be reduced.

The sixth recovery operation may be combined with the fifth recovery operation of FIG. 10 so that when the data transfer rate is set to HIGH, step S108 is performed to determine whether the cumulative number of data transfer errors previously detected is larger than or equal to a predetermined number. In this case, even when the data transfer rate is set to HIGH, the data writing operation can be performed at high speed if the cumulative number of data transfer errors is smaller than the predetermined number.

Thus, according to the present invention, information on data transferred from the host 10 is managed by the segment management table, and when an error occurs during data transfer, data erased from the magneto-optical disk medium 1 for data writing can be recovered based on the managed data.

Further, according to the present invention, when writing data is transferred from the host 10, it may be checked and determined, by referring to the segment management table, whether data to be erased from the magneto-optical disk medium 1 is recoverable in the case of the occurrence of an error during the data transfer. If the data is not recoverable, the data is erased from the magneto-optical disk medium 1 after completion of the data transfer. Therefore, data erasure can be prevented from occurring before the completion of the data transfer, thereby avoiding data loss caused by data erasure.

Further, according to the present invention, in the case of writing data to an important region of the magneto-optical disk medium 1, data may be erased from the magneto-optical disk medium 1 after completion of data transfer. Therefore, data erasure can be prevented from occurring before the completion of the data transfer, thereby avoiding data loss caused by data erasure.

Further, according to the present invention, in the case of writing data, by the instruction of the host 10, to a recording region of the magneto-optical disk medium 1 which region is preset by the host 10 before data transfer, data can be erased from the magneto-optical disk medium 1 after completion of data transfer. Therefore, data erasure can be prevented from occurring before the completion of the data transfer, thereby avoiding data loss caused by data erasure.

Further, according to the present invention, when writing data is transferred, it may be checked and determined whether the cumulative number of data transfer errors that have been detected so far is larger than or equal to a predetermined number. If the cumulative number of detected data transfer errors is larger than or equal to the predetermined number, data is erased from the magneto-optical disk medium 1 after completion of the data transfer. Therefore, data erasure can be prevented from occurring before the completion of the data transfer, thereby avoiding data loss caused by data erasure.

Further, according to the present invention, when writing data is transferred, it may be checked and determined whether the data transfer rate is set to a value higher than or equal to a predetermined value. If the data transfer rate is set to a value higher than or equal to the predetermined value, data is erased from the magneto-optical disk medium 1 after completion of the data transfer. Therefore, data erasure can be prevented from occurring before the completion of the data transfer, thereby avoiding data loss caused by data erasure.

The present invention is not limited to the specifically disclosed embodiment, but variations and modifications may be made without departing from the scope of the present invention.

The invention claimed is:

1. A data recorder for recording data on a recording medium requiring erasure of recorded data before recording the data, the data recorder comprising:
    a data storage part storing data exchanged between the data recorder and a host apparatus;
    an error detection part detecting a data transfer error during transfer of first data from the host apparatus;
    an erasure part erasing second data recorded on the recording medium;
    a determination part that, when said error detection part detects the data transfer error, determines whether data corresponding to the second data erased by said erasure part is stored in said data storage part;
    a recovery part that, when said determination part determines that the corresponding data is stored in said data storage part, recovers the erased second data on the recording medium based on the stored data; and
    an erasure determination part that determines whether to erase the second data recorded on the recording medium in parallel with the transfer of the first data from the host apparatus,
    wherein said erasure part erases the second data recorded on the recording medium based on a result of the determination by said erasure determination part,
    wherein said erasure part, based on the result of the determination by said erasure determination part, erases the second data recorded on the recording medium after the transfer of the first data is completed.

2. A data recorder for recording data on a recording medium requiring erasure of recorded data before recording the data, the data recorder comprising:
    a data storage part storing data exchanged between the data recorder and a host apparatus;
    an error detection part detecting a data transfer error during transfer of first data from the host apparatus;
    an erasure part erasing second data recorded on the recording medium;

a determination part that, when said error detection part detects the data transfer error, determines whether data corresponding to the second data erased by said erasure part is stored in said data storage part;

a recovery part that, when said determination part determines that the corresponding data is stored in said data storage part, recovers the erased second data on the recording medium based on the stored data; and an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part, before the first data is recorded, makes a determination as to whether said data storage part stores data corresponding to the second data to be erased by said erasure part, and determines, based on a result of the determination, whether to erase the second data in parallel with the transfer of the first data, wherein said erasure determination part determines to erase the second data in parallel with the transfer of the first data when said erasure determination part determines that said data storage part stores the data corresponding to the second data to be erased by said erasure part.

3. A data recorder for recording data on a recording medium requiring erasure of recorded data before recording the data, the data recorder comprising:

a data storage part storing data exchanged between the data recorder and a host apparatus;

an error detection part detecting a data transfer error during transfer of first data from the host apparatus;

an erasure part erasing second data recorded on the recording medium;

a determination part that, when said error detection part detects the data transfer error, determines whether data corresponding to the second data erased by said erasure part is stored in said data storage part;

a recovery part that, when said determination part determines that the corresponding data is stored in said data storage part, recovers the erased second data on the recording medium based on the stored data; and an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part, before the first data is recorded, makes a determination as to whether said data storage part stores data corresponding to the second data to be erased by said erasure part, and determines, based on a result of the determination, whether to erase the second data in parallel with the transfer of the first data, wherein said erasure determination part determines to erase the second data after the transfer of the first data is completed when said erasure determination part determines that said data storage part stores no data corresponding to the second data to be erased by said erasure part.

4. A data recorder for recording data on a recording medium requiring erasure of recorded data before recording the data, the data recorder comprising:

a data storage part storing data exchanged between the data recorder and a host apparatus;

an error detection part detecting a data transfer error during transfer of first data from the host apparatus;

an erasure part erasing second data recorded on the recording medium;

a determination part that, when said error detection part detects the data transfer error, determines whether data corresponding to the second data erased by said erasure part is stored in said data storage part; and a recovery part that, when said determination part determines that the corresponding data is stored in said data storage part, recovers the erased second data on the recording medium based on the stored data; and an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part makes determination as to whether recording addresses on the recording medium which addresses are specified when the first data is transferred specify a predetermined region on the recording medium, and determines, based on a result of the determination, whether to erase the second data in parallel with the transfer of the first data, wherein said erasure determination part determines to erase the second data in parallel with the transfer of the first data when said erasure determination part determines that the specified recording addresses specify a region other than the predetermined region on the recording medium.

5. The data recorder as claimed in claim 4, wherein the predetermined region inhibits loss of data.

6. A data recorder for recording data on a recording medium requiring erasure of recorded data before recording the data, the data recorder comprising:

a data storage part storing data exchanged between the data recorder and a host apparatus;

an error detection part detecting a data transfer error during transfer of first data from the host apparatus;

an erasure part erasing second data recorded on the recording medium;

a determination part that, when said error detection part detects the data transfer error, determines whether data corresponding to the second data erased by said erasure part is stored in said data storage part;

a recovery part that, when said determination part determines that the corresponding data is stored in said data storage part, recovers the erased second data on the recording medium based on the stored data, an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part makes determination as to whether recording addresses on the recording medium which addresses are specified when the first data is transferred specify a predetermined region on the recording medium, and determines, based on a result of the determination, whether to erase the second data in parallel with the transfer of the first data, wherein said erasure determination part determines to erase the second data after the transfer of the first data is completed when said erasure determination part determines that the specified recording addresses specify the predetermined region on the recording medium.

7. The data recorder as claimed in claim 6, wherein the predetermined region inhibits loss of data.

8. A data recorder for recording data on a recording medium requiring erasure of recorded data before recording the data, the data recorder comprising:

a data storage part storing data exchanged between the data recorder and a host apparatus;

an error detection part detecting a data transfer error during transfer of first data from the host apparatus;

an erasure part erasing second data recorded on the recording medium;

a determination part that, when said error detection part detects the data transfer error, determines whether data corresponding to the second data erased by said erasure part is stored in said data storage part; and a recovery part that, when said determination part determines that the corresponding data is stored in said data storage part, recovers the erased second data on the recording medium based on the stored data;

an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part makes determination as to whether recording addresses on the recording medium which addresses are specified when the first data is transferred specify a predetermined region on the recording medium, and determines, based on a result of the determination, whether to erase the second data in parallel with the transfer of the first data, wherein the transfer of the first data and the erasure of the second data are prevented from being performed in parallel with each other with respect to the predetermined region.

9. The data recorder as claimed in claim 8, wherein the predetermined region inhibits loss of data.

10. A data recorder for recording data on a recording medium requiring erasure of recorded data before recording the data, the data recorder comprising:

a data storage part storing data exchanged between the data recorder and a host apparatus;

an error detection part detecting a data transfer error during transfer of first data from the host apparatus;

an erasure part erasing second data recorded on the recording medium;

a determination part that, when said error detection part detects the data transfer error, determines whether data corresponding to the second data erased by said erasure part is stored in said data storage part;

a recovery part that, when said determination part determines that the corresponding data is stored in said data storage part, recovers the erased second data on the recording medium based on the stored data; and an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part makes determination as to whether the cumulative number of data transfer errors that have been detected is larger than or equal to a predetermined number, and determines, based on a result of the determination, whether to erase the second data in parallel with the transfer of the first data.

11. The data recorder as claimed in claim 10, wherein said erasure determination part determines to erase the second data in parallel with the transfer of the first data when said erasure determination part determines that the cumulative number of data transfer errors is smaller than the predetermined number.

12. The data recorder as claimed in claim 10, wherein said erasure determination part determines to erase the second data after the transfer of the first data is completed when said erasure determination part determines that the cumulative number of data transfer errors is larger than or equal to the predetermined number.

13. A data recorder for recording data on a recording medium requiring erasure of recorded data before recording the data, the data recorder comprising:

a data storage part storing data exchanged between the data recorder and a host apparatus;

an error detection part detecting a data transfer error during transfer of first data from the host apparatus;

an erasure part erasing second data recorded on the recording medium;

a determination part that, when said error detection part detects the data transfer error, determines whether data corresponding to the second data erased by said erasure part is stored in said data storage part;

a recovery part that, when said determination part determines that the corresponding data is stored in said data storage part, recovers the erased second data on the recording medium based on the stored data; and an erasure determination part that determines whether to erase the second data recorded on the recording medium in parallel with the transfer of the first data from the host apparatus, wherein said erasure part erases the second data recorded on the recording medium based on a result of the determination by said erasure determination part, wherein said erasure determination part makes determination as to whether a rate of transferring the first data is set to be higher than or equal to a predetermined value, and determines, based on a result of the determination, whether to erase the second data in parallel with the transfer of the first data.

14. The data recorder as claimed in claim 13, wherein said erasure determination part determines to erase the second data in parallel with the transfer of the first data when said erasure determination part determines that the rate is set to be lower than the predetermined value.

15. The data recorder as claimed in claim 13, wherein said erasure determination part determines to erase the second data after the transfer of the first data is completed when said erasure determination part determines that the rate is set to be higher than or equal to the predetermined value.

16. A method for recording data on a recording medium requiring erasure of recorded data before recording the data, the method comprising the steps of:
(a) detecting a data transfer error during transfer of first data from a host apparatus to a data recorder;
(b) erasing second data recorded on the recording medium;
(c) determining whether data corresponding to the second data erased by said step (b) is stored in the data recorder when said step (a) detects the data transfer error;
(d) recovering the erased second data on the recording medium based on the data stored in the data recorder when said step (c) determines that the corresponding data is stored in the data recorder; and
(e) determining whether to erase the second data recorded on the recording medium in parallel with the transfer of the first data from the host apparatus,
wherein said step (b) erases the second data recorded on the recording medium based on a result of the determination by said step (e),
wherein said step (b), based on the result of the determination by said step (e), erases the second data recorded on the recording medium after the transfer of the first data is completed.

17. A method for recording data on a recording medium requiring erasure of recorded data before recording the data, the method comprising the steps of:
(a) detecting a data transfer error during transfer of first data from a host apparatus to a data recorder;
(b) erasing second data recorded on the recording medium;
(c) determining whether data corresponding to the second data erased by said step (b) is stored in the data recorder when said step (a) detects the data transfer error;
(d) recovering the erased second data on the recording medium based on the data stored in the data recorder when said step (c) determines that the corresponding data is stored in the data recorder;
(e) determining whether to erase the second data recorded on the recording medium in parallel with the transfer of the first data from the host apparatus,
wherein said step (b) erases the second data recorded on the recording medium based on a result of the determination by said step (e),
wherein said step (e), before the first data is recorded, makes determination as to whether data corresponding to the second data to be erased by said step (b) is stored in the data recorder, and determines, based on a result of the determination, whether to erase the second data in parallel with the transfer of the first data,
wherein said step (e) determines to erase the second data in parallel with the transfer of the first data when said step (e) determines that the data corresponding to the second data to be erased by said step (b) is stored in the data recorder.

18. A method for recording data on a recording medium requiring erasure of recorded data before recording the data, the method comprising the steps of:
(a) detecting a data transfer error during transfer of first data from a host apparatus to a data recorder;
(b) erasing second data recorded on the recording medium;
(c) determining whether data corresponding to the second data erased by said step (b) is stored in the data recorder when said step (a) detects the data transfer error;
(d) recovering the erased second data on the recording medium based on the data stored in the data recorder when said step (c) determines that the corresponding data is stored in the data recorder;
(e) determining whether to erase the second data recorded on the recording medium in parallel with the transfer of the first data from the host apparatus,
wherein said step (b) erases the second data recorded on the recording medium based on a result of the determination by said step (e),
wherein said step (e), before the first data is recorded, makes determination as to whether data corresponding to the second data to be erased by said step (b) is stored in the data recorder, and determines, based on a result of the determination, whether to erase the second data in parallel with the transfer of the first data,
wherein said step (e) determines to erase the second data after the transfer of the first data is completed when said step (e) determines that no data corresponding to the second data to be erased by said step (b) is stored in the data recorder.

19. A method for recording data on a recording medium requiring erasure of recorded data before recording the data, the method comprising the steps of:
(a) detecting a data transfer error during transfer of first data from a host apparatus to a data recorder;
(b) erasing second data recorded on the recording medium;
(c) determining whether data corresponding to the second data erased by said step (b) is stored in the data recorder when said step (a) detects the data transfer error;
(d) recovering the erased second data on the recording medium based on the data stored in the data recorder when said step (c) determines that the corresponding data is stored in the data recorder; and
(e) determining whether to erase the second data recorded on the recording medium in parallel with the transfer of the first data from the host apparatus,
wherein said step (b) erases the second data recorded on the recording medium based on a result of the determination by said step (e),
wherein said step (e) makes determination as to whether recording addresses on the recording medium which addresses are specified when the first data is transferred specify a predetermined region on the recording medium, and determines, based on a result of the determination whether to erase the second data in parallel with the transfer of the first data,
wherein said step (e) determines to erase the second data in parallel with the transfer of the first data when said step (e) determines that the specified recording addresses specify a region other than the predetermined region on the recording medium.

20. The method as claimed in claim 19, wherein the predetermined region inhibits loss of data.

21. A method for recording data on a recording medium requiring erasure of recorded data before recording the data, the method comprising the steps of:
(a) detecting a data transfer error during transfer of first data from a host apparatus to a data recorder;
(b) erasing second data recorded on the recording medium;
(c) determining whether data corresponding to the second data erased by said step (b) is stored in the data recorder when said step (a) detects the data transfer error;
(d) recovering the erased second data on the recording medium based on the data stored in the data recorder when said step (c) determines that the corresponding data is stored in the data recorder; and (e) determining whether to erase the second data recorded on the recording medium in parallel with the transfer of the first data from the host apparatus, wherein said step (b) erases the second data recorded on the recording medium based on a result of the determination by said step (e), wherein said step (e) makes determination as to whether recording addresses on the recording medium which addresses are specified when the first data is transferred specify a predetermined region on the recording medium, and determines, based on a result of the determination, whether to erase the second data in parallel with the transfer of the first data, wherein said step (e) determines to erase the second data after the transfer of the first data is completed when said step (e) determines that the specified recording addresses specify the predetermined region on the recording medium.

22. The method as claimed in claim 21, wherein the predetermined region inhibits loss of data.

23. A method for recording data on a recording medium requiring erasure of recorded data before recording the data, the method comprising the steps of:
- (a) detecting a data transfer error during transfer of first data from a host apparatus to a data recorder;
- (b) erasing second data recorded on the recording medium;
- (c) determining whether data corresponding to the second data erased by said step (b) is stored in the data recorder when said step (a) detects the data transfer error;
- (d) recovering the erased second data on the recording medium based on the data stored in the data recorder when said step (c) determines that the corresponding data is stored in the data recorder; and
- (e) determining whether to erase the second data recorded on the recording medium in parallel with the transfer of the first data from the host apparatus, wherein said step (b) erases the second data recorded on the recording medium based on a result of the determination by said step (e), wherein said step (e) makes determination as to whether recording addresses on the recording medium which addresses are specified when the first data is transferred specify a predetermined region on the recording medium, and determines, based on a result of the determination, whether to erase the second data in parallel with the transfer of the first data, wherein the transfer of the first data and the erasure of the second data are prevented from being performed in parallel with each other with respect to the predetermined region.

24. The method as claimed in claim 23, wherein the predetermined region inhibits loss of data.

25. A method for recording data on a recording medium requiring erasure of recorded data before recording the data, the method comprising the steps of:
- (a) detecting a data transfer error during transfer of first data from a host apparatus to a data recorder;
- (b) erasing second data recorded on the recording medium;
- (c) determining whether data corresponding to the second data erased by said step (b) is stored in the data recorder when said step (a) detects the data transfer error;
- (d) recovering the erased second data on the recording medium based on the data stored in the data recorder when said step (c) determines that the corresponding data is stored in the data recorder;
- (e) determining whether to erase the second data recorded on the recording medium in parallel with the transfer of the first data from the host apparatus, wherein said step (b) erases the second data recorded on the recording medium based on a result of the determination by said step (e), wherein said step (e) makes determination as to whether the cumulative number of data transfer errors that have been detected is larger than or equal to a predetermined number, and determines, based on a result of the determination, whether to erase the second data in parallel with the transfer of the first data.

26. The method as claimed in claim 25, wherein said step (e) determines to erase the second data in parallel with the transfer of the first data when said step (e) determines that the cumulative number of data transfer errors is smaller than the predetermined number.

27. The method as claimed in claim 25, wherein said step (e) determines to erase the second data after the transfer of the first data is completed when said step (e) determines that the cumulative number of data transfer errors is larger than or equal to the predetermined number.

28. A method for recording data on a recording medium requiring erasure of recorded data before recording the data, the method comprising the steps of:
- (a) detecting a data transfer error during transfer of first data from a host apparatus to a data recorder;
- (b) erasing second data recorded on the recording medium;
- (c) determining whether data corresponding to the second data erased by said step (b) is stored in the data recorder when said step (a) detects the data transfer error;
- (d) recovering the erased second data on the recording medium based on the data stored in the data recorder when said step (c) determines that the corresponding data is stored in the data recorder; and
- (e) determining whether to erase the second data recorded on the recording medium in parallel with the transfer of the first data from the host apparatus, wherein said step (b) erases the second data recorded on the recording medium based on a result of the determination by said step (e), wherein said step (e) makes determination as to whether a rate of transferring the first data is set to be higher than or equal to a predetermined value, and determines, based on a result of the determination, whether to erase the second data in parallel with the transfer of the first data.

29. The method as claimed in claim 28, wherein said step (e) determines to erase the second data in parallel with the transfer of the first data when said step (e) determines that the rate is set to be lower than the predetermined value.

30. The method as claimed in claim 28, wherein said step (e) determines to erase the second data after the transfer of the first data is completed when said step (e) determines that the rate is set to be higher than or equal to the predetermined value.

* * * * *